United States Patent [19]

Simons

[11] Patent Number: 5,714,258
[45] Date of Patent: Feb. 3, 1998

[54] FIBER HAVING IMPROVED PROPERTIES, COMPOSITIONS FOR PRODUCING SUCH FIBERS, AND PROCESS FOR IMPROVING PROPERTIES OF FIBERS

[75] Inventor: F. Holmes Simons, Charlotte, N.C.

[73] Assignee: Hoechest Celanese Corporation, Warren, N.J.

[21] Appl. No.: 581,306

[22] Filed: Dec. 28, 1995

Related U.S. Application Data

[63] Continuation of Ser. No. 907,947, Jul. 2, 1992, abandoned.

[51] Int. Cl.$^6$ .................................................... B32B 27/34
[52] U.S. Cl. .................. 428/395; 428/364; 264/178 F; 264/204; 264/210.6; 264/211; 264/211.14; 264/211.224; 525/437
[58] Field of Search ................. 525/437; 264/210.6, 264/211, 178 F, 205, 210.8, 211.14, 211.24; 428/364, 395

[56] References Cited

U.S. PATENT DOCUMENTS

| | | | |
|---|---|---|---|
| 3,337,652 | 8/1967 | Press et al. | 260/895 |
| 3,578,621 | 5/1971 | Stapfer. | |
| 3,660,557 | 5/1972 | Smith et al. | 264/210 |
| 3,875,069 | 4/1975 | Worschech et al. | 252/56 S |
| 4,157,990 | 6/1979 | Lindner et al. | 252/56 S |
| 4,234,708 | 11/1980 | Edelman et al. | 525/444 |
| 4,443,573 | 4/1984 | Wells et al. | 524/308 |
| 4,486,320 | 12/1984 | Sakurai et al. | 252/12.6 |

FOREIGN PATENT DOCUMENTS

| | | |
|---|---|---|
| 1 906 234 | 9/1969 | Germany. |
| 1157343 | 7/1969 | United Kingdom. |
| 2 152 061 | 6/1985 | United Kingdom. |

OTHER PUBLICATIONS

Textiles, vol. 90, 1979, p. 83, 90:205660v New Finish.
Lonza Speciality Chemicals Publication, May 1990, Glycolube 674 Propietary Lubricant.
World Patent Index, Section Ch, Week 8634, Derwent Publications Ltd., London, GB; Class A, AN 86–222073 & JP-A-61 152 819 (TORAY IND INC) 11 Jul. 1986.

*Primary Examiner*—E. Rollins Buffalow
*Attorney, Agent, or Firm*—Gregory N. Clements

[57] ABSTRACT

An improved polyester fiber, polymer composition for producing such fibers by spinning and drawing, and a process for improving the production of fibers from polyester is disclosed wherein an aliphatic diester such as ethylene glycol distearate is incorporated into the polyester resin prior to spinning fibers from the resin in trace amounts of from about 0.01 to about 0.4 percent by weight of the polyester. The composition improves the process of spinning and drawing fibers from the resin and produces superior fibers.

18 Claims, No Drawings

FIBER HAVING IMPROVED PROPERTIES, COMPOSITIONS FOR PRODUCING SUCH FIBERS, AND PROCESS FOR IMPROVING PROPERTIES OF FIBERS

This application is a continuation of application Ser. No. 07/907,947, filed Jul. 2, 1992 now abandoned.

FIELD OF THE INVENTION

This invention relates to improvements in processes for spinning and drawing of polyester polymer compositions for the production of fibers, to improved polyester polymer compositions for spinning and drawing, and to the polyester fibers produced by spinning and drawing.

BACKGROUND OF THE INVENTION

Synthetic fibers produced from polyester polymers are processed to form continuous filaments and staple, or cut-to-length manufactured fibers, that are further processed to product a wide variety of products. Man-made fibers are used in the production of nonwoven products such as surgical gowns and diapers, to name but a few nonwoven products; industrial yarns that are used in the manufacture of belts, straps, and cord for automobile tires; textile yarns that are used for clothing and floor coverings; and others too numerous to mention.

The polymer typically is melted or dissolved in a suitable solvent and then extruded through suitable orifices to form fibers. One of the most common processes for converting bulk polymers to fiber form is melt spinning, in which the polymer is melted and then extruded. The stream of molten polymer cools and solidifies after extrusion to form a solid fiber. The die containing the orifices through which the polymer streams are extruded is known as the jet or spinneret. As fibers are required to be of small diameter, the holes in the jet may be as fine as 0.001 inch in diameter. Fine diameter orifices are easily clogged by particles in the polymer, so the polymer solution or melt is often filtered to remove potential clogging particles.

The extruded and-solidified fiber typically is stretched, or drawn, generally between rolls, to develop the properties that will suit the fiber for the intended end use. However, polymeric materials typically do not have a high draw ratio, which is the ratio of final to original length per unit weight of yarn. Overdrawn yarns tend to break and shrink more than other yarns when heated, and so various additives have been used to increase draw ratios and to improve processing characteristics. For example, various additives such as titanium dioxide, fumed silica, and talc are sometimes added to the polymer melt to improve the processing characteristics, and in particular, the drawing characteristics, of fibers produced by melt spinning. However, these additives have a tendency to agglomerate and can clog filters that are used to remove particles from the polymer melt that might clog the small orifices in the spinneret.

U.S. Pat. No. 3,660,557 discloses incorporating diamides, and in particular N,N'-ethylene bis-stearamide, in polyester melt before spinning to improve the melt rheology and processing characteristics and to increase the draw ratio. N,N'-ethylene bis-stearamide is sold commercially as ACRAWAX C and under numerous other brand names. However, these diamide additives typically result in a yellow color when heated by the polymer melt that is due to the amide linkage in the diamides and that persists in fibers produced on spinning, thus rendering these fibers unsuitable for many textile applications. Diamide additives are said to have a basic waxy character that must be capable of withstanding the temperatures and pressures of polymer spinning. It is also said that the additives must be relatively incompatible with the polymer and chemically stable with respect thereto.

Fibers produced on spinning typically are also covered with finish before drawing to improve processing characteristics. Finishes, which typically are applied at levels of from 0.1% up to 5.0% by weight of the fiber, perform a variety of functions, most commonly as lubricants and antistatic agents, and to supplement the effect of crimp in staple fiber. Since straight fibers will not generally hold together, a crimp, or waviness, is inserted into staple fiber so that it will behave as natural fiber in carding, combing, drafting, and spinning operations to produce end products. Typically, crimp is inserted by mechanical devices such as stuffer boxes. Finishes supplement crimp by increasing cohesion, and help reduce the tendency of fibers to stick to the drawing rolls and to cut through guide surfaces. The fiber to which finishes are applied is in a solid form at a relatively low temperature, so compatibility with the polymer is generally not of concern as it has been with polymer additives. While generally satisfactory in performance, finishes are expensive to apply, are generally subject to contamination, and can cause wastewater disposal problems.

Polyol esters are used as finish ingredients for polyester fibers and non-polyester fibers, and as lubricants that may be incorporated into engineering resins, or plastics, which generally are molded into tough, hard, and rigid forms in comparison to the ductile, flexible form used for spinning and drawing of fibers. For example, Lonza, Inc. Specialty Chemicals, 17-17 Route 208, Fair Lawn, N.J., 07410, sells a variety of polyol esters and other compounds for the above purposes. U.S. Pat. No. 4,486,320 discloses molded tape guides for magnetic recording tape formed from engineering resins having from 0.3 to 5.0 percent by weight of esters of higher fatty acids and polyhydric alcohols. However, no suggestion is made to incorporate a polyol ester into a polyester melt prior to fiber spinning. No suggestion is made that the lubricating properties of polyol esters can be preserved for the drawing of fibers if the ester is incorporated into a compatible polyester resin under conditions at which the ester can be expected to react.

A need exists for a process by which the processing characteristics and other properties of polyester fibers are improved while avoiding the drawbacks of additives and finishes presently suggested for use in the spinning and drawing of fibers.

SUMMARY OF THE INVENTION

It has now been found that mixing of trace amounts of fatty acid esters with polyester resin prior to spinning fibers from the resin not only reduces the need for additives and finishes, but improves the properties of fibers beyond previously achieved levels. Many of the additives previously incorporated in the polymer melt and finishes applied to fibers can be reduced in quantity or eliminated altogether, with no discoloration of the fiber and with little waste or contamination of water. This improvement in processing characteristics and in physical properties is surprising in that fatty acid esters are generally considered to be compatible with polyester and copolymerize with the polymer melt prior to spinning, in contrast to the teachings of U.S. Pat. No. 3,660,557 regarding ACRAWAX C. Also unexpected, the benefits in processing characteristics and fiber properties are achieved in the practice of this invention by adding trace amounts of fatty acid esters, which are below the level of additives and finishes typically used to enhance processing characteristics.

The resin composition of the invention and the fibers of the invention produced therefrom include in addition to the base polyester composition, a copolymer of a fatty acid ester and the same polyester. In one specific embodiment, the resin composition and the fibers produced therefrom comprise a polyethylene terephthalate polyester and aliphatic diester, such as ethylene glycol distearate, at least a portion of which will be copolymerized with the polyester.

DETAILED DESCRIPTION OF THE INVENTION

The basic process for improving the production of fibers from polyester, and specifically for improving the spinning and drawing characteristics of polyester polymer, comprises the steps of (a) incorporating into the polyester resin prior to spinning fibers from the resin a sufficient amount of a fatty acid ester to improve the production of fibers formed from the polyester; and (b) spinning and drawing fibers from the resin. The ester is added in trace amounts and can be incorporated into the resin prior to melt spinning of the resin using conventional methods and equipment for achieving a well dispersed additive that will be apparent to the skilled artisan. The ester can be added at any time prior to spinning of fibers.

One method of incorporating the fatty acid ester into the resin prior to spinning is to incorporate the ester into the resin during the polymerization reaction in which the polyester resin is formed. The ester can also be blended with polyester chips, flake, or powder prior to melting, or injected into the polyester melt prior to spinning. If the fatty acid ester is a solid at room temperature, then it will generally be advantageous to distribute the additive as a powder over polyester chips, flake, or powder prior to melting the polymer. The polyester chips, flake, or powder should then be tumbled to ensure an even distribution of the ester additive over the polymer and prior to application of vacuum and heat to dry the polymer. Otherwise, application of vacuum or heat may cause loss or agglomeration of the ester. After tumbling, the polymer is heated until it becomes molten and can be passed through the spinneret.

A broad range of polyesters and fatty acid esters is contemplated for use with the present invention. The most commonly used polyester will probably be polyethylene terephthalate polyester, although the benefits of the invention can be achieved with sulfoisophthalate polyester, polybutylene terephthalate polyester, and others.

While not wishing to be bound by theory, it is believed that the polyesters and the fatty acid esters react by ester interchange to form a copolymer of the polyester and the fatty acid ester, and that the small amount of copolymer that is contained in the resin and in the fibers produced from the resin may be responsible for the unexpected improvement in processing and in properties of the polymer and fibers produced therefrom.

Precipitation experiments show that ethylene glycol distearate, when added to polyethylene terephthalate polyester in the trace amounts of the invention, is distributed in the polyester primarily as a copolymer with the polyester when the distearate is added during the polymerization reaction. Only relatively small amounts of the distearate can be extracted by dissolving the polymer in a suitable solvent. Methanolysis of polymer samples to break the polymer down to its original monomers shows relatively much larger amounts of the distearate are chemically bound in the polymer than not.

The degree of polymerization achieved is believed to depend upon the specific polyester, the specific fatty acid ester, and the conditions under which the fatty acid ester comes into contact with the polyester. For example, if the fatty acid ester is introduced during the polymerization reaction, then it seems likely that most of the fatty acid ester would be copolymerized with the polyester. On the other hand, if added to the polymer melt shortly before extrusion, then it may be that less of the copolymer is formed. It is contemplated that the fatty acid ester and the molten polymer resin will be in intimate contact for a dwell time prior to spinning of fibers of at least 2 to 5 minutes or more, and so significant polymerization probably occurs. Whatever the mechanism, the lubricating, wax-like properties of the fatty acid ester appear to be maintained despite the compatibility between the polymer and the ester, regardless of the degree of copolymerization. Further, the fibers produced from the resin containing the fatty acid ester show superior physical properties, as detailed below.

The fatty acid esters may be any of the esterified carboxylic acids derived from carboxylic acids having from 1 to 26 carbon atoms. The carboxylic acids are comprised chiefly of alkylhydrocarbon groups ($CH_2$, $CH_3$), typically in a straight chain (aliphatic) and terminating is a carboxyl group (COOH). Aliphatic esters are preferred, and aliphatic diesters are especially preferred, wherein the fatty acid ester molecule contains 2 ester linkages available for reaction with the polyester polymer, although monoesters are also readily available. A particularly preferred aliphatic diester is ethylene glycol distearate, which is commercially available from several sources. One ethylene glycol distearate is sold as Glycolube 674, although several other brands are available. Glycolube 674 is described as a synthetic wax useful as an internal lubricant for rigid polyvinyl chloride, ABS polymers of acrylonitrile, butadiene, and styrene, and polystyrenic compounds, with which polymers the distearate is incompatible.

The benefits of the invention can be achieved at low concentrations of fatty acid ester in the polyester polymer. Many of the benefits of the present invention can be obtained when the fatty acid ester is incorporated into the polyester in an amount equal to or greater than at least about 0.01 percent by weight of the polyester. Lubricating properties of the ester are more pronounced at somewhat higher concentrations. Nevertheless, if more than a trace amount of the ester is used, then the positive effects begin to taper off. In accordance with the present invention, it has been determined that the upper range of effectiveness of the fatty acid ester additive is about 0.4 percent by weight of the polyester.

At the lower concentrations, additives such as talc, fumed silica, and titanium dioxide can be substantially reduced or even eliminated altogether as drawing aids while simultaneously increasing the draw ratio and improving other properties of the fibers as is described below with reference to the examples. In the upper ranges for concentration of the fatty acid ester in the polyester, lubricating finishes can be eliminated from the spinning and drawing process. A preferred range of fatty acid ester in the polyester is from at least about 0.02 percent to about 0.3 percent.

By eliminating most finishes from the spinning and drawing process, the present invention obtains cost savings, environmental, and processing advantages. Liquid finishes typically are used in higher concentrations and generally cost more than the relatively low levels of fatty acid esters that are incorporated into the polymer. The lubricating effect of the fatty acid esters is more pronounced, even at the much lower levels at which they are used, which causes less sticking of fibers to the drawing rolls. Since the additive is incorporated directly into the polymer, there is little or no loss onto the processing floor or into exhaust air ducts, as compared to finishes. If any finishes, such as antistatic finishes, are used, then contamination by other finishes can be reduced by eliminating these finishes. Reducing the amount of contaminated finishes also reduces or substantially eliminates excess load on wastewater treatment systems from dumping of contaminated finishing emulsions. Since the lubricant is incorporated into the polymer, the melt viscosity of the polymer is generally lower, which results in a reduced power consumption by extruders and meter pumps and longer process life.

The benefits of the invention are illustrated and supported by the following comparative examples in which data is tabulated comparing fibers from polyester terephthalate polymer resin having Glycolube 674 added thereto to polyester polymer having no additive, and to polyester polymer having an ACRAWAX C additive.

TABLE 1

| As Spun Properties | | | | | | |
|---|---|---|---|---|---|---|
| Spin Speed (K fpm) | 12.5 | 12.5 | 12.5 | 13.5 | 13.5 | 13.5 |
| Additive | None | Acrawax | FAE | None | Acrawax | FAE |
| Tenacity (gpd) | 3.76 | 3.80 | 3.71 | 3.84 | 3.97 | 3.96 |
| Elong. (%) | 82.1 | 92.2 | 93.1 | 75.3 | 81.3 | 91.0 |
| TVE | 34.1 | 36.5 | 35.8 | 33.3 | 35.8 | 37.8 |
| I.M. (gpd) | 49 | 77 | 91 | 56 | 75 | 116 |
| HAS (%) | 7.0 | 7.4 | 6.5 | 7.4 | 9.1 | 6.0 |
| Uster (%) | 1.13 | 1.10 | 1.01 | 1.17 | 1.09 | 0.85 |
| $\Delta^n$ | 95 | 92 | 88 | 107 | 107 | 97.8 |
| $\Delta^n$CV | 7.3 | 4.0 | 7.1 | 8.1 | 5.2 | 8.0 |
| Cryst. (%) | 30.2 | 29.1 | 29.5 | 38.7 | 33.8 | 33.8 |

Table 1 compares the properties of spun fibers made in accordance with the invention to spun fibers containing the conventional ACRAWAX additive and spun fibers containing no additives. The fibers are formed at two spinning speeds and without drawing from a polyester polymer having an intrinsic viscosity of 0.74 and containing 200 parts per million (0.02% by weight) of FAE (fatty acid ester, Glycolube 674). As is readily apparent, both the ACRAWAX and FAE additives show improvement over plain polyester polymer. However, the fibers containing the fatty acid ester additive show a marked improvement over both plain and ACRAWAX containing fibers. Both elongation and tensile factor, TvE, are increased, and initial modulus, I.M., shows a large increase. Each of these factors is related to the ability of a fiber to withstand higher draw ratios. The hot air shrinkage factor (HAS) is decreased for the ester containing fiber, which is remarkable both in the degree of reduction of shrinkage and in that shrinkage was reduced with an increase in tensile factor and modulus. Generally speaking, shrinkage increases with an increase in these factors.

Tables 2 and 3 show properties for drawn fibers at two different speeds and at various drawing ratios. Data are presented for a polyethylene terephthalate polyester containing no additive, containing ACRAWAX, and containing ethylene glycol distearate. Table 2 shows that the ethylene glycol distearate additive enables the polyester polymer to be drawn at higher draw ratios and significantly improves the properties of the fiber. Table 3 shows a similar result.

TABLE 2

| Drawn Properties Spun At 12,500 FPM - No Relax | | | | |
|---|---|---|---|---|
| Draw Ratio | 1.74 | 1.74 | 1.81 | 1.86 |
| Additive | None | Acrawax | FAE | FAE |
| Denier | 220 | 220 | 218 | 213 |
| Ten. (gpd) | 8.18 | 8.47 | 9.50 | 9.55 |
| Elong. (%) | 11.1 | 7.4 | 6.4 | 6.2 |
| I.M. (gpd) | 134 | 142 | 176 | 175 |
| HAS (%) | 7.0 | 9.5 | 7.8 | 8.0 |

TABLE 3

| Drawn Properties Spun At 13,500 FPM - No Relax | | | | |
|---|---|---|---|---|
| Draw Ratio | 1.73 | 1.73 | 1.73 | 1.80 |
| Additive | None | Acrawax | FAE | FAE |
| Denier | WNR | 214 | 224 | 214 |
| Ten. (gpd) | | 9.14 | 9.01 | 9.69 |
| Elong. (%) | | 7.0 | 7.1 | 6.3 |
| I.M. | | 148 | 152 | 175 |
| HAS | | 10.0 | 7.0 | 7.2 |

Table 4 shows data obtained for drawn fibers made in accordance with the present invention and 5 plyed to 1000/225. This table shows remarkably high values for tenacity, elongation, and initial modulus for such fibers, with an unusual and unexpectedly low shrinkage factor.

TABLE 4

| Drawn Properties - No Relax | | | | | | | |
|---|---|---|---|---|---|---|---|
| Draw Ratio | 1.82 | 1.85 | 1.89 | 1.83 | 1.86 | 1.89 | 1.93 |
| Denier | 985 | 976 | 957 | 992 | 978 | 962 | 943 |
| Tenacity | 9.53 | 9.74 | 10.14 | 9.34 | 9.69 | 9.86 | 10.16 |
| Elong. | 7.8 | 7.6 | 7.5 | 7.9 | 7.7 | 7.6 | 7.4 |
| I.M. | 126 | 129 | 132 | 125 | 130 | 134 | 136 |
| HAS | 8.2 | 8.2 | 8.0 | 7.7 | 7.8 | 8.0 | 8.2 |

Tables 5A and 5B show a comparison between the drawn properties of fibers made in accordance with the present invention wherein the additive is incorporated at a level of 200 ppm and at a level of 2000 ppm, for two different spinning speeds. The table illustrates that fatty acid esters may be increased in concentration with an increase in beneficial properties. It is generally accepted that ACRAWAX provides beneficial properties, although not to the extent of this invention, only up to about 0.02% by weight and that the properties of the fibers begin to fall off if the concentration is increased beyond 0.02 percent.

TABLE 5A

| Comparison Of FAE Additive Level Properties 10,500 FPM | | |
|---|---|---|
| | 0.02% | 0.20% |
| Max. D.R. | 1.86 | 1.80 |
| Denier | 203 | 191 |
| Tenacity | 9.16 | 9.58 |
| Elong. | 5.9 | 6.8 |
| I.M. | 151 | 165 |
| H.A.S. | 7.8 | 9.0 |

TABLE 5B

| Comparison Of FAE Additive Level Properties 12,500 FPM | | |
|---|---|---|
|  | 0.02% | 0.20% |
| Max. D.R. | 1.82 | 1.83 |
| Denier | 192 | 199 |
| Tenacity | 8.95 | 9.71 |
| Elong. | 6.1 | 5.9 |
| I.M. | 145 | 174 |
| H.A.S. | 3.0 | 8.2 |

The invention has been explained with reference to the above tables and embodiments, but it is not intended that the invention be limited to the scope of these examples. On the contrary, the skilled artisan will recognize that modifications may be made in the practice of the invention, and that the invention should be accorded the full scope of equivalent processes, resin compositions, and fibers as defined by the appended claims.

What is claimed is:

1. A process for improving the production of fibers from polyester comprising the steps of:
   (a) incorporating into a polyester resin prior to spinning fibers from the resin an aliphatic diester in an amount equal to or greater than 0.01% by weight of the polyester;
   (b) copolymerizing at least a portion of the aliphatic diester and polyester resin; and
   (c) spinning and drawing fibers from the resin.

2. The process of claim 1 wherein the aliphatic diester is incorporated into the resin during the polymerization reaction in which the polyester resin is formed, blended with polyester chips, flake, or powder, or injected into the polyester melt.

3. The process of claim 1 wherein the aliphatic diester is incorporated into the polyester in an amount equal to or less than about 0.4% by weight of the polyester.

4. The process of claim 1 wherein the aliphatic diester is ethylene glycol distearate.

5. The process of claim 1 wherein the polyester is polyethylene terephthalate.

6. A process according to claim 1 wherein the aliphatic diester is selected from esterified carboxylic acids derived from carboxylic acids having from 1 to 26 carbon atoms.

7. A process according to claim 6 wherein the polyester is selected from the group consisting of polyethylene terephthalate, sulfoisophthalate polyester and polybutylene terephthalate.

8. A process for improving the production of fibers from polyester comprising the steps of:
   (a) incorporating into a polyester resin prior to spinning fibers from the resin from about 0.01 to about 0.4% of an aliphatic diester by weight of the polyester; and (b) spinning and drawing fibers from the resin.

9. The process of claim 8 wherein the aliphatic diester is incorporated into the polyester in an amount from at least about 0.02% to about 0.3% by weight of the polyester.

10. The process of claim 8 wherein the aliphatic diester is intimately contacted with the polyester resin for a time and under conditions sufficient to cause a major portion of the aliphatic diester to react with the polyester and to become copolymerized with the polyester.

11. The process of claim 10 wherein the aliphatic diester is ethylene glycol distearate.

12. The process of claim 8 wherein the polyester is polyethylene terephthalate polyester.

13. A fiber prepared from a polyester resin, said fiber comprising a base polyester composition and an aliphatic diester dispersed through said base composition, said aliphatic diester having been added to said polyester composition prior to preparing said fiber with no cross linking of the polyester and said aliphatic diester.

14. The fiber of claim 13 wherein said polyester is polyethylene terephthalate.

15. The fiber of claim 14 wherein said aliphatic diester is ethylene glycol distearate.

16. A fiber prepared from polyethylene terephthalate polyester resin, said fiber comprising a base composition of polyethylene terephthalate polyester and further comprising a copolymer of said polyethylene terephthalate polyester and ethylene glycol distearate dispersed throughout said polyester, said ethylene glycol distearate having been added to said polyester composition prior to preparing said fiber.

17. A fiber prepared from a polyester resin, said fiber comprising a base polyester composition and an aliphatic diester and further comprising a copolymer of said polyester and said aliphatic diester dispersed throughout said polyester, said aliphatic diester having been added to said polyester composition prior to preparing said fiber.

18. A fiber according to claim 17, wherein the polyester is selected from the group consisting of polyethylene terephthalate, sulfoisophthalate polyester and polybutylene terephthalate.

* * * * *